United States Patent Office 3,185,668
Patented May 25, 1965

3,185,668
DIRECT ESTERIFICATION
Delbert H. Meyer and Paul J. Mehalso, Highland, Ind., assignors to Standard Oil Company, Chicago, Ill., a corporation of Indiana
No Drawing. Filed Aug. 31, 1959, Ser. No. 836,902
18 Claims. (Cl. 260—75)

This invention relates to the direct esterification of terephthalic acid and mixtures of terephthalic acid containing up to about 35% by weight of isophthalic acid with a diol to provide an ester product which is suitable for conversion to high molecular weight linear polyesters under reduced pressure and elevated temperature. This invention also relates to the preparation of high molecular weight linear condensation polyesters which are capable of being drawn to pliable, strong fibers or into oriented films.

Synthetic linear condensation polyesters derived from diols and terephthalic acid, as well as diols and mixtures of terephthalic acid containing up to about 35% by weight isophthalic acid, which are capable of being drawn into pliable, strong fibers or films having oriented crystalline structures are well known. These polyesters have proven to be of considerable commercial value. In general, these polyesters are formed from an ester product of terephthalic acid and mixtures of terephthalic acid containing up to about 35% by weight isophthalic acid and a polyol containing from 2 to 10 carbon atoms. These diols are of the general formula HO—A—OH wherein A may be the linear hydrocarbon chain containing from 2 to 10 methylene groups or A may be a hydrocarbon containing a saturated ring as in the bis-methylol cyclohexanes, especially the 1,4 isomer or A may be a hydrocarbon containing a benzene ring as in bis-methylol benzenes, $\alpha,\alpha'$-dihydroxy xylene, especially terephthalyl alcohol. Specific high molecular weight linear polyesters which have attained commercial prominence are polyethylene terephthalate, polyesters derived by co-condensing ethylene glycol derivatives of terephthalic and isophthalic acids and polyesters obtained from the bis-methylol cyclohexane esters of isophthalic acid and/or terephthalic acid. In general, the high molecular weight linear polyesters are obtained by the polycondensation or polymerization of what has been sometimes referred to as a monomer ester under reduced pressure and at elevated temperatures. The monomer ester formed contains hydroxy ester groups as in the bis-2-hydroxyethyl terephthalates and isophthalates and the bis (methylol cyclohexyl) terephthalates and isophthalates. The conversion of these hydroxy ester group containing monomers to the high molecular weight linear polyesters under reduced pressure and at elevated temperature is accompanied by the splitting out of the diol employed to form the ester monomer. The polymerization or polycondensation process has been generally carried out in the presence of a catalyst. The literature is replete with proposed polymerization or polycondensation catalysts. The literature also contains reference to the polycondensation or polymerization of the hydroxy ester group containing monomer in the absence of a catalyst. Although polyesters of suitable high molecular weight can be obtained, they are only obtained after excessively long polycondensation or polymerization reactions which result in a dark-colored product lacking uniform properties. The use of the various polymerization or polycondensation catalysts are said to reduce the time required to produce suitable high molecular weight polyesters of light color and uniform properties.

The art has long been aware that the hydroxy ester group containing monomers can be directly prepared by reacting the diol with terephthalic acid and terephthalic acid containing up to about 35% by weight isophthalic acid. For example, British Patent 578,079 describes the esterification of terephthalic acid with ethylene glycol by refluxing the mixture. However, substantially complete esterification is only accomplished after about 72 hours' reaction time. Commercially, the hydroxy ester group containing monomers are prepared indirectly by a transesterification process involving the reaction of the diol with a dialkyl ester of terephthalic acid or mixtures containing dialkyl esters of terephthalic acid and dialkyl esters of isophthalic acid. In commercial practice dimethyl terephthalate and mixtures thereof with dimethyl isophthalate are employed in the transesterification process. Even here, to avoid excessive reaction conditions and excessively long reaction times transesterification catalysts are employed. Many transesterification catalysts have been proposed and are described in the literature. These transesterification catalysts include litharge, lithium hydride, a combination of lithium hydride and zinc acetate, among many others. Another reason for employing the indirect route to the monomer ester was that terephthalic acid of sufficient high purity was unobtainable per se. To obtain a highly pure form of terephthalic acid it was necessary to prepare a readily purifiable form. The lower dialkyl esters, such as dimethyl terephthalate, were found to be suitable derivatives to satisfy the need for a highly pure form of terephthalic acid. These esters can be purified by techniques readily adaptable to commercial practice including recrystallization and fractionation.

Numerous processes for the preparation of the hydroxy ester group containing monomer by direct reaction of terephthalic acid with the diol have been proposed. For example, in British Patent 777,628 it is proposed that the reaction between terephthalic acid and the diol be carried out at superatmospheric pressure and that temperatures above the normal boiling point of the glycol be employed. This patent discloses that as the reaction proceeds the pressure increases due to the formation of water by the esterification reaction and the pressure is reduced periodically by bleeding off a portion of the vapors from the reactor to maintain a predetermined pressure. When such a process is carried out at 230° C. in a stirred autoclave maintained at 35 p.s.i. pressure with a frequent bleed off of pressure to maintain the 35 p.s.i., the reaction between terephthalic acid and ethylene glycol is said to be completed in about 2½ to 3 hours. When the pressure is maintained at 50 p.s.i. by the frequent bleeding off of steam from vapors from the reactor and the pressure is dropped to about 1 atmosphere after 70% esterification is obtained, complete esterification is accomplished in about one hour. Other direct reactions between the diol and terephthalic acid involve the use of large excesses of the diol, more than 10 moles per mole of acid, as well as complicated procedures for separating the useful monomeric diester and mono diol acid ester from reaction products containing low molecular weight polymers, some of which contain ether linkages. Still another direct esterification process involves the addition of a small amount of preformed low molecular weight polymer of the diol terephthalate to a mixture of the diol and terephthalic acid and heating this mixture at a temperature above the normal boiling point of the glycol, generally at elevated pressures. Such a process is actually one of autocatalysts wherein the preformed low molecular weight polymer operates as a catalyst. One precaution in the preparation of the high molecular weight linear polyester is to avoid conditions which favor the formation of polymeric material containing ether linkages. One drawback of the autocatalytic process for the direct esterification employing preformed low molecular weight polymer is that this polymer can introduce ether linkages in the final product. The difficulties in the polycondensation or polymerization process arising from ether linkage formation are difficult in and of themselves to overcome without introducing a potential ether linkage contaminant in the preparation of a monomer ester.

Although the process of British Patent 777,628 appears to have solved the direct esterification problem by employing superatmospheric pressure, the readily apparent drawback of bleeding off steam from the vapors to reduce the amount of steam in the gasiform mixture in the reaction vessel is the removal of some of the ethylene glycol which would also be present in the vapors since it has a boiling point of 197–200° C. Furthermore, in spite of the fact that this process has been available for a number of years, it has not been put into commercial practice.

From the foregoing it will be abundantly clear that a commercially adaptable process for the direct esterification of terephthalic acid and mixtures of terephthalic acid with isophthalic acid with the diol hereinbefore defined which will provide the hydroxy ester group containing monomer in a form and purity suitable for the preparation of high molecular weight linear polyesters would be highly desirable.

A process has now been discovered for such a direct esterification process for reacting high purity terephthalic acid and high purity terephthalic acid containing up to about 35% by weight high purity isophthalic acid with a diol of the formula HO—A—OH, wherein A is a divalent hydrocarbon group containing from 2 to 10 carbon atoms and being either an open chain divalent polymethylene group of 2 to 10 carbon atoms or a divalent hydrocarbon group containing a saturated or unsaturated ring as hereinbefore defined. This process involves reacting at a temperature above the normal boiling point of said diol, 200 to 300° C., a mixture containing from 2 to 6 moles of diol, preferably 3 to 4 moles of diol, for each mole of the phthalic acid under superatmospheric pressure, preferably the autogenetic pressure developed in the closed system, preferably at 230 to 280° C. In this process the superatmospheric pressure is maintained throughout the esterification reaction by conducting the reaction in a closed system at the autogenetic pressure of the reaction mixture until the reaction mixture is a clear fluid product wherein at least 50% of the total carboxyl groups of the terephthalic acid or mixture thereof with up to 35% isophthalic acid being esterified is converted to hydroxy ester groups. In this process the water produced by the esterification reaction and the excess diol are not removed from the reaction mixture. In order to reduce the possible or potential oxidation of the diol to products which would have a deleterious effect on the color of the polyester product produced from the hydroxy ester of terephthalic acid by the foregoing esterification process, it is desirable to carry out the direct esterification in the absence of oxygen. This can be accomplished by purging the reaction equiment with an oxygen-free inert gas. Preferably nitrogen. Also, the mixture of reactants before being heated to reaction temperature can be subjected to alternate purging with nitrogen and evacuation and finally the vapor space filled with nitrogen at atmospheric pressure. It is also desirable to heat the reaction mixture to reaction temperature as rapidly as possible to obtain as efficient use of the reaction vessel as possible. To provide good contact between the reactants and to provide efficient heat transfer, it is desirable for optimum esterification to agitate the reaction mixture. When the reaction mixture has become a clear fluid product, 50% or more, up to 85%, of the carboxyl groups of the terephthalic acid, and when present, of the isophthalic acid will have been converted to hydroxy ester groups, —COOA—OH, wherein A has the meaning hereinbefore stated. This fluid product can be withdrawn and cooled to form a crystalline product. It is preferred to solidify the product in the absence of oxygen to prevent its reaction and/or inclusion in the ester product. The solid crystalline product will be very white in color and will feel waxy. It can be sold per se to producers of polyester for ultimate conversion into fibers and film. The crystalline solid obtained from the direct esterification of terephthalic acid with 2 to 6 moles of ethylene glycol by the process of this invention is low melting, melting in the range of 50 to 100° C.

The clear fluid ester product of the reaction hereinbefore described as resulting from the process of this invention need not be first cooled and solidified before being converted to film or fiber-forming polyesters. When the esterification reaction is a step in an integrated process for producing the high molecular weight linear polyesters from which films and fibers can be made, it is preferred to proceed directly with the clear fluid ester product rather than cooling and solidifying it. To do so will require the removal of the esterification by-product water and any excess diol present. Again this is done in an oxygen-free atmosphere and preferably with agitation. While the clear fluid ester product is at reaction temperature and at the reaction pressure, vapors are withdrawn. As the mixture cools, heating is applied to maintain a temperature just below, from 10 to 25° C. below, the boiling point of the diol. The mixture of water and diol removed can be condensed and processed to recover the diol or the wet diol can be discarded. Not all of the excess diol, if present, will be removed by the time the mixture reaches atmospheric pressure. Thereafter to remove the excess diol the pressure is reduced while maintaining the temperature at 10 to 25° C. below the boiling point of the diol. By the time the pressure has been reduced to about 100 mm. Hg, all of the excess diol will have been removed. The pressure is further reduced to below about 0.5 mm. Hg, preferably to 0.3 to 0.1 mm. Hg or below, and the ester product remaining is heated to the polycondensation temperature. The ester product prepared by the process of this invention after removal of water and excess diol, if any, can be converted into a high molecular weight linear polyester suitable for preparing fibers and films in short reaction times without the use of a polycondensation catalyst. For example, the hydroxyethylene terephthalate produced by the direct esterification process of this invention can be converted to a polyester in from 2 to 4 hours at 0.5 mm. Hg or below without a polycondensation catalyst. However, as is the case with similar hydroxethyl terephthalates produced by the conventional ester interchange route, the polycondensation reaction is substantially speeded up in the presence of any of the conventional polycondensation catalysts such as titanium oxide, titanium tetrafluoride, ferric acetate, litharge, lead oxide, antimony trioxide, organo tin compounds and organo magnesium halides, and titanium tetralkoxide and ammonium salts thereof, among many others. Without a catalyst the hydroxyethylene terephthalate produced by direct esterification by the process of this invention has been converted to a white polyester having an intrinsic viscosity of 0.665 (measured in a solvent comprising 60% phenol and 40% tetrachloroethane) and a melting point of 265.3° C. which could be readily drawn into fiber filaments.

By "high purity terephthalic acid" and "high purity terephthalic acid containing up to 35% high purity isophthalic acid" as employed herein is meant such pure terephthalic acids which have a DMF color of below 10, preferably 5 or less, a TEG color of below 200, desirably below about 150 and preferably 100 or less, and a carboxybenzaldehyde content of below 0.5 percent (either 4-carboxybenzaldehyde or 3-carboxybenzaldehyde or both), desirably 0.1 or below and preferably as low as 0.05 to 0.01 percent by weight. The DMF color and TEG colors are both based on the Hazen scale. The DMF color is determined by comparing the color of a solution of 5 grams of terephthalic acid in 100 milliliters of dimethyl formamide with APHA standards, Hazen scale. The TEG color is obtained by combining 4 grams of terephthalic acid with 28 milliliters of triethylene glycol by heating at 500° F. in a glass tube in an aluminum block with a purge of nitrogen for about one hour. The tube is removed, the contents of the tube cooled to room temperature in 30 minutes and diluted 1 to 1 with isopropyl alcohol. The color of the resulting solution is determined by comparison with standard APHA colors, Hazen scale.

In general, the high molecular weight linear polyesters suitable for film and fiber preparation are exceedingly viscous, high melting materials. Also, the determination of the molecular weights of these polyesters is most difficult by conventional methods. For these reasons, the polymeric characteristics of the polyester are measured and determined by intrinsic viscosity, which is expressed by the relationship of the viscosity of a dilute solution of the polyester, the viscosity of the solvent (both at the same temperature), and the concentration of the polyester in solution. The expression is:

$$[\eta] = \frac{1}{4C}(N_r - 1 + 3 \ln N_r)$$

wherein $[\eta]$ is the intrinsic viscosity, $N_r$ is the flow time of a dilute solution of the polyester divided by the flow time of the solvent, both taken at the same temperature, and C is the concentration of the polyester in the dilute solution in grams per 25 milliliters of solution. This expression, the Billmeyer equation, is only accurate when the polymer concentration is between 0.970 and 0.1030 gram per 25 ml. Depending on the particular end use to which the polyester is to be put, acceptable intrinsinc viscosities for the polyester as is reported in the literature may be in the range of 0.3 to 1.2. For fiber formation, polyethylene terephthalate, in addition to melting at 265° C. or above, should have an intrinsic viscosity above 0.5, desirably 0.6 and above and preferably in the range of 0.6 to 0.7. The film-forming polyesters can be in the range of from 0.3 to 0.6, desirably above 0.4 and preferably 0.4 to 0.5. The polymer resulting from polycondensation when extruded into rods or ribbons and cooled quickly is glass-like and crystallizes on heating to about 100° C. In such a form it is not satisfactory for fibers and films. It is generally cut into chips, remelted, spun into a fiber filament and then oriented by drawing to form fibers or extruded or cast and then drawn to orient and heated to stabilize to form the film.

Suitable diols of the formula hereinbefore set forth which are useful for the process of this invention include ethylene glycol, 1,3-trimethylene glycol, 1,4-tetramethylene glycol, 1,5-pentamethylene glycol, 1,6-hexamethylene glycol, 1,7-heptamethylene glycol, 1,8-octamethylene glycol, 1,9-nonamethylene glycol, 1,10-decamethylene glycol, cyclohexanedimethylol (1,4-dihydroxymethyl cyclohexane), p-cyclohexanediol (1,4-quinitol) and terephthalyl alcohol ($\alpha,\alpha'$-dihydroxy p-xylene), among others. These diols have been previously disclosed as reactants generally with dimethyl terephthalate or isophthalate and/or terephthalyl or isophthalyl chlorides to form the corresponding di (hydroxyalkyl) or di (methylolphenyl) terephthalate and isophthalate monomers used in the production of high molecular weight linear polyesters from which fibers and films can be prepared.

The following examples will illustrate the process of this invention both with respect to the direct esterification and to the integrated process through the polycondensation.

*Example I*

There are charged to a reaction vessel, having glass inner surface and containing a stirrer, 0.167 mole of high purity terephthalic acid (Acid No. 675, DMF solution color on Hazen scale 5, triethylene glycol reaction product color 170 Hazen scale, and 4-carboxybenzaldehyde content of 0.1 percent) and 0.5 mole ethylene glycol (mole ratio diol to acid, 3 to 1). The reactor is closed and air is removed by alternate evacuating and purging with nitrogen while stirring the resulting mixture. The stirred slurry in the closed reactor is heated with a circulating external oil bath at 260° to 265° C. In about twenty minutes the slurry is at reaction temperature, 250°±5° C., and a pressure of 40 p.s.i.g. (about 3.7 atmospheres). After about one hour after the beginning of heatup, the pressure in the reactor increases gradually to 60 p.s.i.g. (about 5 atmospheres). The oil bath temperature is maintained at 260° C. from the time the internal pressure reaches 40 p.s.i.g. until the end of the esterification reaction, as determined by the reaction mixture turning from a slurry to a clear fluid product. The reaction mixture becomes a clear fluid product in about 100 minutes from the time the slurry reached reaction temperature. At this point about 50% of the carboxyl groups had been converted to 2-hydroxyethyl ester groups. The reaction was continued for about 20 minutes longer, at which time over 85% of the carboxy groups had been converted to 2-hydroxyethyl ester groups. The reaction mixture when solidified is a white crystalline solid of waxy feel and appearance.

Such a product is cooled to room temperature (about 25 to 27° C.) in the presence of nitrogen and is transferred to a reaction vessel containing a stirring device and attached to a vacuum system through a condenser. The 2-hydroxyethyl ester containing product of the direct esterification is stirred and heated with a 197° C. bath at substantially atmospheric pressure with a continuous, slow sweep of nitrogen by adding nitrogen below the liquid surface while water is being removed. As soon as the water stops coming over, the pressure in the reaction vessel is reduced as rapidly as possible without causing excessive foaming, still with a continuous, slow nitrogen sweep through the liquid while removing excess ethylene glycol. When no further ethylene glycol distills over at 0.5 to 0.7 mm. Hg, the temperature of the mixture is increased rapidly to 280 to 285° C. and the pressure reduced to 0.3 mm. Hg. The reaction mixture is held at 280 to 285° C. and 0.3 mm. Hg for about 140 minutes with stirring and nitrogen is bubbled through the mass while the glycol that is split out is removed. The reaction mixture becomes increasingly viscous at the end of the 140 minutes at 0.3 mm. Hg. The system is cut off from the vacuum source and the reaction product blanketed with nitrogen.

The resulting polyethylene terephthalate is cooled to 25 to 30° C. This white crystalline product has an intrinsic viscosity of 0.665 as measured in a mixed solvent comprising 60% phenol and 40% tetrachloroethane. The melting point of the polyester is 265.3° C. as measured on a Kofler hot stage with a polarizing light microscope. Commercial polyethylene terephthalate for fiber manufacture has a melting point, determined in the same manner, of 265.0° C. The polyethylene terephthalate prepared as described is readily drawable into fiber filaments.

The total time for direct esterification through polycondensation is about 5 hours and 55 minutes. It will be noted that the process from esterification through polycondensation comprises three steps: (1) direct esterification, (2) water and excess glycol removal and (3) polycondensation.

*Example II*

The process of Example I is repeated except the hot direct esterification product is transferred to the polycondensation reaction vessel which has had air removed and replaced with nitrogen. The pressure is released to atmospheric pressure during the transfer by bleeding off vapors from the polycondensation vessel through the condenser with a slow sweep of nitrogen. The stirring mechanism in the polycondensation vessel is started so soon as the hot fluid can be stirred. The pressure is reduced as rapidly as possible without carry-over of foam to the condenser. The temperature of the transfer fluid is permitted to drop to 185 to 195° C. during the removal of water and excess glycol. Thereafter the fluid mixture is rapidly heated with stirring and a slow bleed of nitrogen into the liquid to 280 to 285° C. and 0.2 to 0.3 mm. Hg. In a total reaction time of about 4 hours there can be produced a white polyethylene terephthalate having an intrinsic viscosity of 0.65 to 0.67 and a melting point of at least 265.0° C.

*Example III*

The process of Example II is repeated except that as soon as the direct esterification reaction product is a clear fluid, it is transferred to the polycondensation vessel where water and excess glycol are removed at 185 to 190° C. at a pressure decreased from 60 p.s.i.g. to about 200 mm. Hg in a nitrogen atmosphere and then subjected to polycondensation conditions at 280 to 285° C. and 0.2 to 0.3 mm. Hg. The over-all time for this batch process to produce fiber grade white polyethylene terephthalate, M.P. of at least 265.0° C. and intrinsic viscosity of 0.6 to 0.7, may be reduced to the range of 3 to 4 hours.

*Example IV*

The process of Example I is repeated except that antimony trioxide is added in an amount of about 0.02 weight percent based on the ester product after removal of water and unreacted glycol. The resulting white polyester has an intrinsic viscosity of 1.2 and a melting point of above 265° C.

*Example V*

For a continuous direct esterification process, a slurry containing glycol and high purity terephthalic acid in a mole ratio of 3 to 1 (weight ratio of about 1.115 to 1.0) is continuously prepared by continuously feeding and mixing the glycol and terephthalic acid in the stated proportions. The slurry is continuously withdrawn through a degassing zone under reduced pressure where entrained air is removed and nitrogen is bubbled through the slurry while the slurry is heated to 50° C. with agitation. Further heating of the slurry is accomplished by pumping it through a preheater in countercurrent, indirect heat exchange flow with the withdrawn, clear fluid product of the direct esterification. The slurry so heated is pumped into a closed esterification system wherein the mixture is maintained at 250–255° C. and 60 p.s.i.g. and is vigorously agitated. The esterification system may comprise, for example, a continuous tube, a series of pot-type vessels or a pot-type vessel for the major proportion of the esterification with the final portion being conducted in a tubular reactor such as glass pipe, with a recycle to the pot-type reaction vessel so that visual control of withdrawal can be accomplished for startup. When the direct esterification product is a clear fluid, it is withdrawn through the above-described indirect heat exchanger to preheat the slurry and to cool the esterification product to about 50° C. Thereafter the ester product can be cooled, for example on a flaking device, and the waxy crystalline product packaged.

The above-described continuous esterification may be integrated with a step for continuously removing water and unreacted glycol and a step for continuously converting the glycol terephthalate to a film or fiber-forming polyester. One method for accomplishing this would require a modification of the above continuous direct esterification process, for the product of the continuous esterification would only be employed to partially preheat the slurry before it was charged to the esterification system. The esterification product at 250 to 255° C. would only be cooled to about 185 to 190° C. by the heat exchange preheating of the slurry. The remainder of the preheating, say up to 175 to 180° C., would be accomplished by some other means. The partially cooled esterification product would be continuously charged to a system where the pressure would be reduced as the fluid flows through in the presence of a nitrogen atmosphere and water and unreacted glycol would be distilled off at 185 to 190° C. and at a pressure down to about 200 mm. Hg. The resulting glycol terephthalate would be continuously charged to a polycondensation zone where there is a high ratio of heat transfer surface area to volume of ester undergoing polycondensation. All or part of the heat transfer surfaces could be scraped or a portion of the heat transfer surfaces could be part of a means for agitating the mixture. The mixing of the ester undergoing polycondensation should provide rapid diffusion of the glycol split out and, hence, as the polycondensation product becomes more viscous, it will be advantageous to subject a thinner and thinner film to the heating surfaces. High temperature differentials between the viscous liquid and the heat transfer surfaces should be avoided so as to prevent discoloration of the polyester product. A portion of the agitation of the ester undergoing polycondensation may advantageously be supplied by the introduction of nitrogen, which provides the oxygen-free atmosphere necessary for best polycondensation results. The polycondensation should be carried out at a liquid temperature not exceeding about 285 to 290° C. and at a pressure of below 0.5 mm. Hg, preferably 0.3 to 0.1 mm. Hg.

The resulting high molecular weight polyester, polyethylene terephthalate, can be discharged to a reservoir or surge tank having an oxygen-free atmosphere and pumped to spinnerettes or pumped directly to spinnerettes to spin fiber filaments which are drawn to orient the polymer and form the fiber which then may be crimped and chopped into fiber staples.

*Example VI*

A mixture of the hydroxyethyl esters of tetrphthalic acid and isophthalic acid suitable for subjecting to polycondensation after removal of water and excess glycol to prepare a high molecular weight linear polyester having an incipient melting point of 229 to 230° C. and an intrinsic viscosity of 0.6 to 0.7 from which film can be prepared, may be obtained according to the process of this invention in the following manner.

A degassed (air and oxygen-free) slurry containing 3 moles of ethylene glycol per mole of phthalic acid in a mixture containing 95% terephthalic acid and 5% isophthalic acid by weight is heated to 255–260° C. and 78 p.s.i.g. in an oxygen-free atmosphere until a clear fluid reaction product is obtained, about one hour. The 95/05 mixture of terephthalic acid and isophthalic acid has a low carboxybenzaldehyde content, less than 0.5% and DMF and TEG colors of 5 and 100, respectively. The resulting mixture containing the hydroxyethyl terephthalate (95%) and isophthalate (5%) is cooled to 190° C. and water excess glycol are removed. Thereafter the mixture of esters is heated in the presence of nitrogen with vigorous stirring at 285° C. at 0.5 mm. Hg with the removal of glycol split out until the viscosity of the polymer, as indicated by a measuring device attached to the agitator shaft, is in the desired range, about 3 to 5 hours. The mixture is tempered at 120 to 140° C. under nitrogen for several hours and then extruded in the melt state to form an amorphous film which can be drawn into an oriented film in the usual manner.

*Example VII*

The process of Example VI is repeated except that a mixture of 65% terephthalic acid and 35% isophthalic acid of the same high purity is employed and a high molecular weight linear copolyester having an incipient melting point of 153 to 155° C. and having an intrinsic viscosity of 0.6 to 0.7 is prepared.

By the process of Example I a reaction product containing 4-hydroxycyclohexyl terephthalates can be prepared from 1,4-quinitol and high purity terephthalic acid, 4-methylolcyclohexylmethyl terephthalates can be prepared from 1,4-dimethylol cyclohexane (cis form) and high purity terephthalic acid, and 4-methylolbenzyl terephthalates can be prepared from α,α'-dihydroxy-p-xylenes and high purity terephthalic acid. Linear polyesters of high molecular weight can be readily prepared from these hydroxyester monomers in the manner hereinbefore described with only minor modifications, taking into account the known nature of these polymers, some of which are higher melting than polyethylene terephthalate.

When terephthalic acid and mixtures of terephthalic acid with up to 35% isophthalic acid of substantially lesser purity than hereinbefore defined as high purity are employed in the process of this invention for direct esterification, the esterification step requires excessively long periods of time to obtain an ester product wherein there is substantially no free phthalic acid and the ester product is highly colored. Polyesters prepared from such an ester product even in the presence of a catalyst are dark in color and lack uniform properties as well as having melting points below that acceptable for film and fiber preparation.

What is claimed is:

1. A non-catalytic process for the direct esterification of a phthalic acid whose carboxyl groups are separated by at least three ring carbon atoms and said phthalic acid contains at least 65% terephthalic acid and less than 0.1 percent carboxybenzaldehydes by weight with a diol whose molecule contains 2 to 10 carbon atoms and, other than the two hydroxy groups, contains only carbon and hydrogen atoms, to an ester product suitable for conversion to a drawable film or fiber-forming linear polyester which comprises heating with agitation at a temperature of from 200 to 300° C. in the absence of oxygen a mixture consisting essentially of 2 to 6 moles of said diol for each mole of said phthalic acid in a closed reaction system at the autogenetic pressure of the mixture until a clear fluid product is obtained wherein at least 50% of the total carboxyl groups of said phthalic acid has been converted to hydroxy ester groups.

2. A non-catalytic process for the direct esterification of a phthalic acid whose carboxyl groups are separated by at least three ring carbon atoms and said phthalic acid contains at least 65% terephthalic acid and less than 0.1 percent carboxybenzaldehydes by weight with a diol whose molecule contains 2 to 10 carbon atoms and, other than the two hydroxy groups, contains only carbon and hydrogen atoms, to an ester product suitable for conversion to a drawable film or fiber-forming polyester which comprises heating with agitation at a temperature of from 200 to 300° C. in the absence of oxygen a mixture consisting essentially of 2 to 6 moles of said diol for each mole of said phthalic acid in a closed reaction system at the autogenic pressure of the mixture until a clear fluid product is obtained wherein at least 50% of the total carboxyl groups of said phthalic acid has been converted to hydroxy ester groups, and cooling the resulting clear fluid product to a temperature from 20° to 30° C.

3. A non-catalytic process for the direct esterification of a phthalic acid whose carboxyl groups are separated by at least three ring carbon atoms and said phthalic acid contains at least 65% terephthalic acid and less than 0.1 percent carboxybenzaldehydes by weight with a diol whose molecule contains 2 to 10 carbon atoms and, other than the two hydroxy groups, contains only carbon and hydrogen atoms, to an ester product suitable for conversion to a drawable film or fiber-forming polyester which comprises heating with agitation at a temperature of from 200 to 300° C. in the absence of oxygen a mixture consisting essentially to 2 to 6 moles of said diol for each mole of said phthalic acid in a closed reaction system at the autogenetic pressure of the mixture until a clear fluid product is obtained wherein at least 50% of the total carboxyl groups of said phthalic acid has been converted to hydroxy ester groups, cooling the resulting clear fluid product to a temperature of from 20° to 30° C. in the presence of an oxygen-free inert atmosphere, and removing the cooled product from said reaction system.

4. The process of claim 1 wherein the diol is paradimethylol benzene.

5. The process of claim 1 wherein the diol is 1,4-dimethylol cyclohexane.

6. The process of claim 1 wherein the diol is a polymethylene glycol containing 2 to 10 methylene groups.

7. The process of claim 1 wherein the diol is ethylene glycol.

8. A non-catalytic process for the direct esterification of terephthalic acid containing less than 0.1 percent 4-carboxybenzaldehyde to an ester product suitable for conversion to a drawable fiber or film-forming polyethylene terephthalate which comprises heating with agitation at a temperature of from 200° to 300° C. in the absence of oxygen a mixture consisting essentially of 2 to 6 moles of ethylene glycol for each mole of said terephthalic acid in a closed reaction system at the autogenetic pressure of the mixture until a clear fluid product is obtained wherein at least 50% of the total carboxyl groups of terephthalic acid has been converted to hydroxyethyl ester groups.

9. The process of claim 8 wherein a solid product is recovered by removing the clear fluid product from said reaction system cooling the clear fluid product to a temperature of from 20° to 30° C.

10. The process of claim 9 wherein the clear fluid product is cooled to a temperature in the range of 20° to 30° C. in the presence of an oxygen-free atmosphere.

11. The process for preparing a hydroxyethyl terephthalate suitable for conversion to a drawable film and fiber-forming polyethylene terephthalate which comprises heating with agitation at a temperature of about 260 to 265° C. in the absence of oxygen a mixture consisting of 3.0 moles of ethylene glycol for each mole of highly pure terephthalic acid containing less than 0.05 percent of 4-carboxybenzaldehyde having a dimethyl formamide solution APHA color of less than 10 and a triethylene glycol reaction product APHA color of less than 200, in a closed reaction system at the autogenetic pressure of the mixture until a clear fluid product is obtained wherein at least 80% of the total carboxy groups of terephthalic acid is converted to hydroxyethyl ester groups, recovering the clear fluid product from said reaction system cooling the the resulting clear fluid product to a solid product at 20 to 30° C. to recover a solidified product.

12. In a process for the preparation of drawable film and fiber-forming polyesters from a diol which contains 2 to 10 carbon atoms in the molecule and which contains, other than the two hydroxy groups, only carbon and hydrogen atoms and from a phthalic acid whose carboxyl groups are separated by at least three ring carbon atoms said phthalic acid containing at least 65% terephthalic acid, the improved steps comprising heating with agitation at a temperature of from 200 to 300° C. in the absence of oxygen a mixture consisting essentially of from 2 to 6 moles of said diol for each mole of said phthalic acid which has a carboxybenzaldehyde content of less than 0.1 percent by weight in a closed reaction system at the autogenetic pressure of the mixture until a clear fluid product is obtained wherein at least 50% of the total carboxyl groups of said phthalic acid is converted to hydroxy ester groups, cooling the clear fluid product to a temperature in the range of from 180 to 200° C., removing water produced by the esterification reaction and excess diol by maintaining said cooled clear fluid product at 180 to 200° C. and at a pressure of from atmospheric to about 2.0 mm. Hg while agitating said clear fluid in an oxygen-free atmosphere, and heating the resulting dehydrated clear fluid with agitation in an oxygen-free atmosphere at a temperature above the melting point of the polyester product at a pressure of below about 0.5 mm. Hg until the polyester product has an intrinsic viscosity in the range of 0.4 to 0.7.

13. The process of claim 12 wherein the diol is p-dimethylol benzene.

14. The process of claim 12 wherein the diol is p-dimethylol cyclohexane.

15. The process of claim 12 wherein the diol is ethylene glycol.

16. The non-catalytic process for the preparation of a drawable film and fiber-forming polyethylene terephthalate which comprises heating with agitation a slurry consisting essentially of 3.0 moles of ethylene glycol for each mole of terephthalic acid having a 4-carboxybenzaldehyde content of less than 0.1 percent by weight, a DMF solution APHA color of less than 10, and a TEG reaction product APHA color of less than 200 to a temperature of from 260° to 265° C. in an oxygen-free atmosphere in a closed system at the autogenetic pressure of the mixture until a clear fluid product is obtained wherein at least 85% of the total carboxyl groups of said terephthalic acid is converted to hydroxyethyl ester groups, cooling said clear fluid product to a temperature in the range of 180° to 200° C. in the presence of an oxygen-free inert gas, maintaining said clear fluid product at a temperature of from 180° to 200° C. and at a pressure from atmospheric to about 2.0 mm. Hg while removing water formed during esterification and excess glycol with agitation, thereafter heating said dehydrated clear fluid product to a temperature in the range of 280° to 300° C. at a pressure below about 0.5 mm. Hg with agitation in the presence of an oxygen-free inert gas until the polyethylene terephthalate has an intrinsic viscosity of 0.5 to 0.7.

17. The process for the preparation of a drawable film and fiber-forming polyethylene terephthalate which comprises heating with agitation in the absence of a catalyst a slurry consisting essentially of 3.0 moles of ethylene glycol for each mole of terephthalic acid having a 4-carboxybenzaldehyde content of less than 0.1 percent by weight, a DMF solution APHA color of less than 10, and a TEG reaction product APHA color of less than 200 to a temperature of from 260° to 265° C. in an oxygen-free atmosphere in a closed system at the autogenetic pressure of the mixture until a clear fluid product is obtained wherein at least 85% of the total carboxyl groups of said terephthalic acid is converted to hydroxyethyl ester groups, cooling said clear fluid product to a temperature in the range of 180° to 200° C. in the presence of an oxygen-free inert gas, maintaining said clear fluid product at a temperature of from 180° to 200° C. and a pressure from atmospheric to about 2.0 mm. Hg while removing water formed during esterification and excess glycol with agitation, thereafter heating said dehydrated clear fluid product to a temperature in the range of 280° to 300° C. at a pressure below about 0.5 mm. Hg with agitation in the presence of a polycondensation catalyst and in the presence of an oxygen-free inert gas until the polyethylene terephthalate has an intrinsic viscosity of 0.5 to 0.7.

18. The solid crystalline composition derived by cooling the clear fluid product obtained from the direct esterification of a phthalic acid whose caboxyl groups are separated by at least three ring carbon atoms containing at least 65% terephthalic acid and less than 0.1% carboxybenzaldydes by weight with a diol whose molecule contains 2 to 10 carbon atoms and, other than the two hydroxy groups, contains only carbon and hydrogen atoms, to an ester product by heating with agitation at a temperature of from 200 to 300° C. in the absence of oxygen a mixture consisting essentially of 2 to 6 moles of said diol for each mole of said phthalic acid in a closed reaction system at the autogenetic pressure of the mixture until a clear fluid product is obtained wherein at least 50% and up to 85% of the total carboxyl groups of said phthalic acid has been converted to hydroxy ester groups.

References Cited by the Examiner

UNITED STATES PATENTS

| | | | |
|---|---|---|---|
| 2,465,319 | 3/49 | Whinfield | 260—75 |
| 2,641,592 | 6/53 | Hofrichter | 260—75 |
| 2,855,432 | 10/58 | Binder | 260—475 |
| 2,877,262 | 3/59 | Binder et al. | 260—475 |
| 3,047,621 | 7/62 | Tate | 260—75 |
| 3,050,533 | 8/62 | Munro et al. | 260—75 |

FOREIGN PATENTS

| | | |
|---|---|---|
| 296,787 | 2/30 | Great Britain. |
| 727,790 | 4/55 | Great Britain. |
| 777,628 | 6/57 | Great Britain. |

WILLIAM H. SHORT, *Primary Examiner.*

MILTON STERMAN, P. E. MANGAN, LOUISE P. QUAST, *Examiners.*